(12) United States Patent
Fuerstenberg et al.

(10) Patent No.: US 10,210,492 B2
(45) Date of Patent: Feb. 19, 2019

(54) BEVERAGE HOLDER HAVING A CHIP UNIT FOR PERFORMING PAYMENT TRANSACTIONS

(71) Applicant: Visa U.S.A. Inc., San Francisco, CA (US)

(72) Inventors: Zack Fuerstenberg, Toronto (CA); Ayman Hammad, Pleasanton, CA (US); Brian Triplett, El Dorado Hills, CA (US); Christopher M. Renton, Oakville (CA); Michael Stephenson, Toronto (CA)

(73) Assignee: VISA U.S.A. INC., San Francisco, CA (US)

( * ) Notice: Subject to any disclaimer, the term of this patent is extended or adjusted under 35 U.S.C. 154(b) by 0 days.

(21) Appl. No.: 15/266,982

(22) Filed: Sep. 15, 2016

(65) Prior Publication Data

US 2017/0004464 A1    Jan. 5, 2017

Related U.S. Application Data

(63) Continuation of application No. 12/608,523, filed on Oct. 29, 2009, now Pat. No. 9,471,915.

(60) Provisional application No. 61/109,795, filed on Oct. 30, 2008, provisional application No. 61/153,578, filed on Feb. 18, 2009.

(51) Int. Cl.
*G06Q 20/10* (2012.01)
*G06Q 20/20* (2012.01)
*G06Q 20/32* (2012.01)
*G06Q 20/34* (2012.01)
*G06K 19/07* (2006.01)
*G06Q 20/40* (2012.01)

(52) U.S. Cl.
CPC .......... *G06Q 20/102* (2013.01); *G06K 19/07* (2013.01); *G06Q 20/20* (2013.01); *G06Q 20/3223* (2013.01); *G06Q 20/3278* (2013.01); *G06Q 20/341* (2013.01); *G06Q 20/40* (2013.01); *G06Q 2220/00* (2013.01)

(58) Field of Classification Search
USPC .................................................. 235/375, 492
See application file for complete search history.

(56) References Cited

U.S. PATENT DOCUMENTS

| 5,739,512 A * | 4/1998 | Tognazzini ........ G06Q 20/0453 235/380 |
| 6,102,162 A | 8/2000 | Teicher |
| 6,184,846 B1 * | 2/2001 | Myers ................... G07F 13/025 141/351 |

(Continued)

OTHER PUBLICATIONS

U.S. Appl. No. 12/608,523 , "Final Office Action", dated Feb. 27, 2015, 12 pages.

(Continued)

*Primary Examiner* — Rafferty Kelly
(74) *Attorney, Agent, or Firm* — Kilpatrick, Townsend & Stockton, LLP

(57) ABSTRACT

A beverage holder apparatus includes a chip unit attached to a beverage holder and adapted to communicate with a chip unit reader to perform a payment transaction to purchase the beverage. The chip unit stores an account identifier associated with a financial account, and transmits the stored account identifier to the chip unit reader to perform the payment transaction.

17 Claims, 9 Drawing Sheets

(56) References Cited

U.S. PATENT DOCUMENTS

| | | |
|---|---|---|
| 7,845,375 B2 | 12/2010 | Dorney |
| 2002/0087542 A1 | 7/2002 | Itabashi |
| 2003/0167207 A1 | 9/2003 | Berardi et al. |
| 2004/0133511 A1 | 7/2004 | Smith et al. |
| 2004/0260607 A1 | 12/2004 | Robbins et al. |
| 2005/0087255 A1* | 4/2005 | Humphrey ......... A47G 19/2227 141/94 |
| 2006/0061482 A1* | 3/2006 | Monney ............... G06K 7/0008 340/9.1 |
| 2007/0215239 A1 | 9/2007 | Dorney |
| 2007/0235533 A1 | 10/2007 | Giordano |
| 2009/0001177 A1 | 1/2009 | Smith et al. |
| 2009/0144205 A1* | 6/2009 | Hurry .................. G06Q 20/085 705/75 |

OTHER PUBLICATIONS

U.S. Appl. No. 12/608,523, "Non-Final Office Action", dated Dec. 2, 2015, 13 pages.
U.S. Appl. No. 12/608,523, "Non-Final Office Action", dated Sep. 24, 2014, 13 pages.
U.S. Appl. No. 12/608,523, "Notice of Allowance", dated Jun. 16, 2016, 8 pages.
U.S. Appl. No. 12/608,523, "Office Action", dated Dec. 8, 2011, 10.
U.S. Appl. No. 12/608,523, "Office Action", dated May 25, 2012, 12.
European Search Report, EP Application No. 09827974.8, dated May 7, 2012, 10 pages.

\* cited by examiner

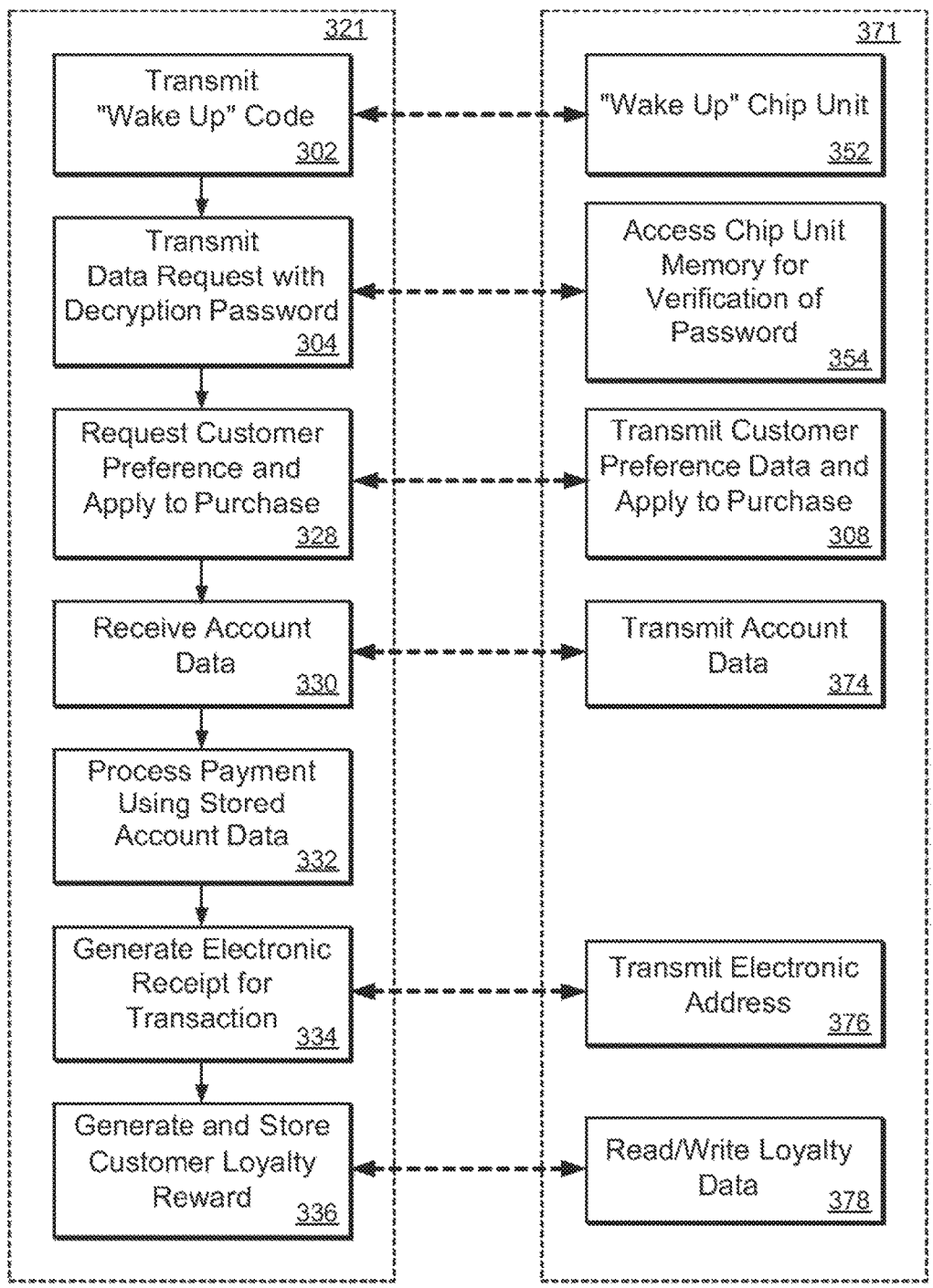
F I G. 6B

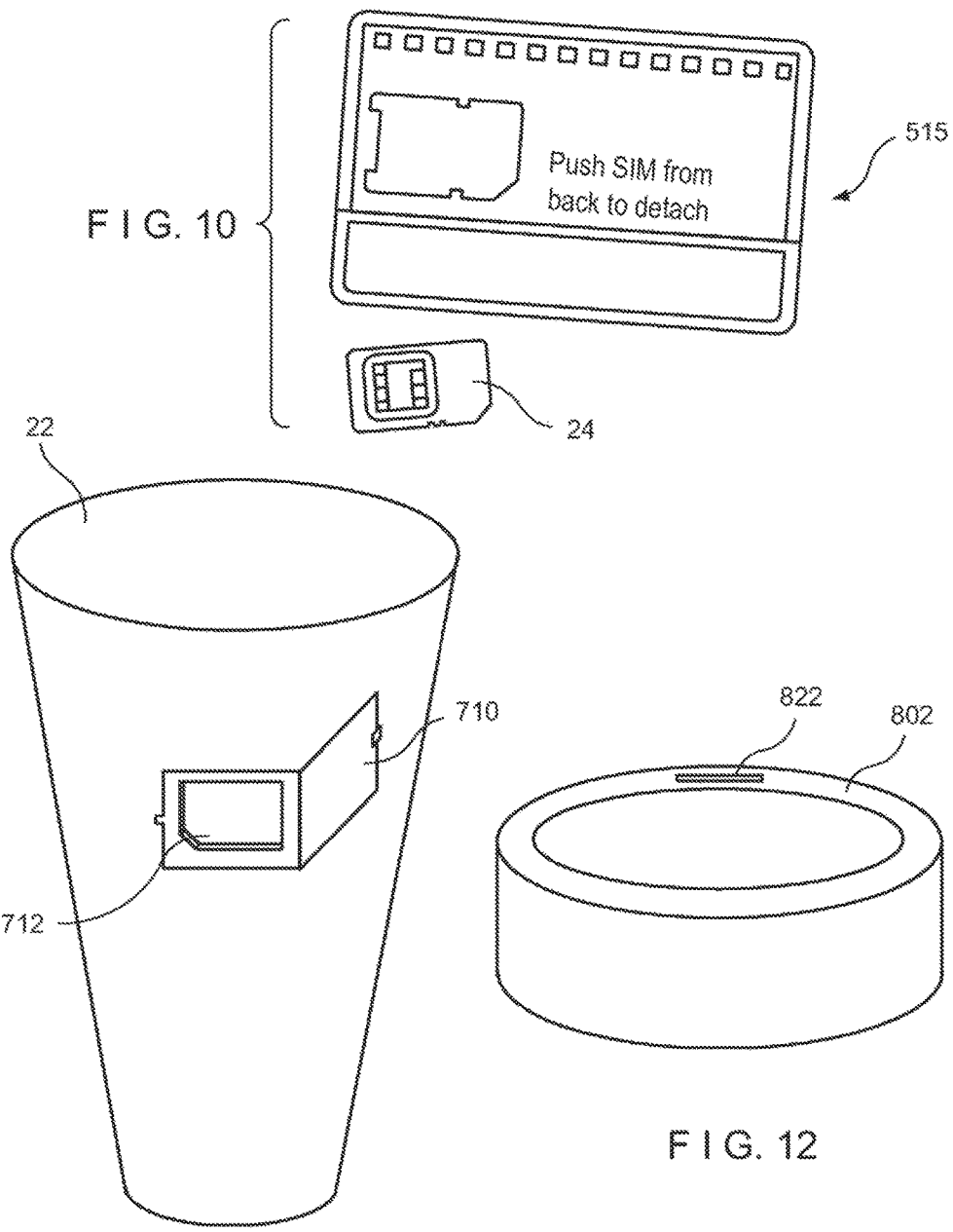

BEVERAGE HOLDER HAVING A CHIP UNIT FOR PERFORMING PAYMENT TRANSACTIONS

CROSS-REFERENCE TO RELATED APPLICATIONS

This application is a continuation application of and claims priority to U.S. patent application Ser. No. 12/608,523 entitled, "BEVERAGE HOLDER HAVING A CHIP UNIT FOR PERFORMING PAYMENT TRANSACTIONS" filed Oct. 29, 2009, which claims priority under 35 U.S.C. § 119 to U.S. provisional patent application Serial Nos. 61/109,795 filed on Oct. 30, 2008 and 61/153,578 filed on Feb. 18, 2009, all of which are incorporated herein by reference.

FIELD OF THE INVENTION

The present invention relates to payment transactions using a smart chip, and more particularly to a beverage holder having a chip unit for performing payment transactions to pay for the beverage.

BACKGROUND OF THE INVENTION

Consumers are constantly seeking faster methods of paying for purchases. This is especially true for beverage purchases such as coffee purchases at a coffee shop. A typical beverage purchase at a coffee shop requires a consumer to place an order, wait for the order, and pay for the beverage. Conventionally, the customer withdraws cash from his pocket or wallet, or retrieves a credit or debit card, for presentation to a cashier. Even if the consumer is only purchasing a beverage from a merchant that offers both food and beverages, he often must wait in a line to place and pay for the order. In some locations, there is a line to place an order and a separate line to pay for the order.

Certain coffee shops and convenience stores allow, and often encourage, a consumer to purchase a beverage container that he can refill himself or is refilled by the merchant. This is desirable because the merchant can save money on the cost of cups while at the same time can be environmentally sensitive. However, a consumer that purchases a refutable container still must present that container and proceed through the same inconvenient steps of placing and paying for their order by withdrawing cash or a payment card from his pocket or wallet.

It would, therefore, be desirable to allow a consumer to expedite his or her beverage purchase in an ecologically-friendly manner.

SUMMARY OF THE DISCLOSURE

The present invention provides a system and method for facilitating and expediting the purchase of beverages. In one aspect of the present invention, a beverage holder apparatus is provided including the underlying beverage holder and a chip unit attached to the holder and adapted to communicate with a chip unit reader to perform a payment transaction to pay for the beverage. The chip unit stores an account identifier associated with a financial account, and transmits the stored account identifier to the chip unit reader to perform the payment transaction.

In another aspect of the present invention, a beverage holder apparatus includes the underlying beverage holder, and a chip unit attached to the holder and including a memory, an interface and a controller. The memory is provided for storing at least an account identifier associated with a financial instrument. The interface communicates with a chip unit reader, and the controller is coupled to the memory and the interface and is adapted to transmit the stored account identifier to the chip unit reader through the interface.

BRIEF DESCRIPTION OF THE DRAWINGS

FIG. 6B is a process flow diagram of a chip unit reader and merchant computer communicating with a chip unit (or purchasing a beverage using a beverage holder apparatus according to another embodiment of a system and method of the present invention;

FIG. 10 is an illustration of a chip unit for use with a beverage holder apparatus or accessory for a beverage holder apparatus according to an embodiment of the present invention;

FIG. 11 is an illustration of a beverage holder apparatus according to an additional embodiment of the present invention; and FIG. 12 is an illustration of an embodiment of an accessory band for attachment to a beverage holder apparatus according to the present invention.

DETAILED DESCRIPTION OF THE INVENTION

Figure 1:
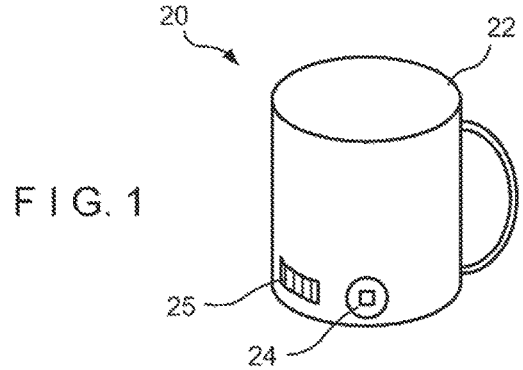
FIG. 1 is a diagram of a beverage holder apparatus incorporating a chip unit according to the present invention.

Referring now to FIG. 1, a beverage holder apparatus 20 includes the underlying holder 22 such as a travel mug, and a chip unit 24 attached to the holder 22. The chip unit 24 can be permanently or removably attached to the holder on a portion of the body, base, handle or other convenient location. In certain embodiments, the chip unit 24 is attached to the holder at a location that facilitates its communication with a chip unit reader to perform a payment transaction to pay for the beverage contained in the holder 22. For example, the chip unit 24 can be positioned proximate the base of the beverage holder 22. Accordingly, when a customer places the beverage holder apparatus 20 upon a surface having a chip unit reader below such surface, near-range communication with the chip unit 24 is facilitated to carry out a transaction to purchase the beverage contained in the beverage holder apparatus 20. In additional embodiments, the beverage holder apparatus 20 may also include a bar code 25 that can facilitate setup of the beverage holder apparatus 20 at the point-of-sale.

Figure 2:
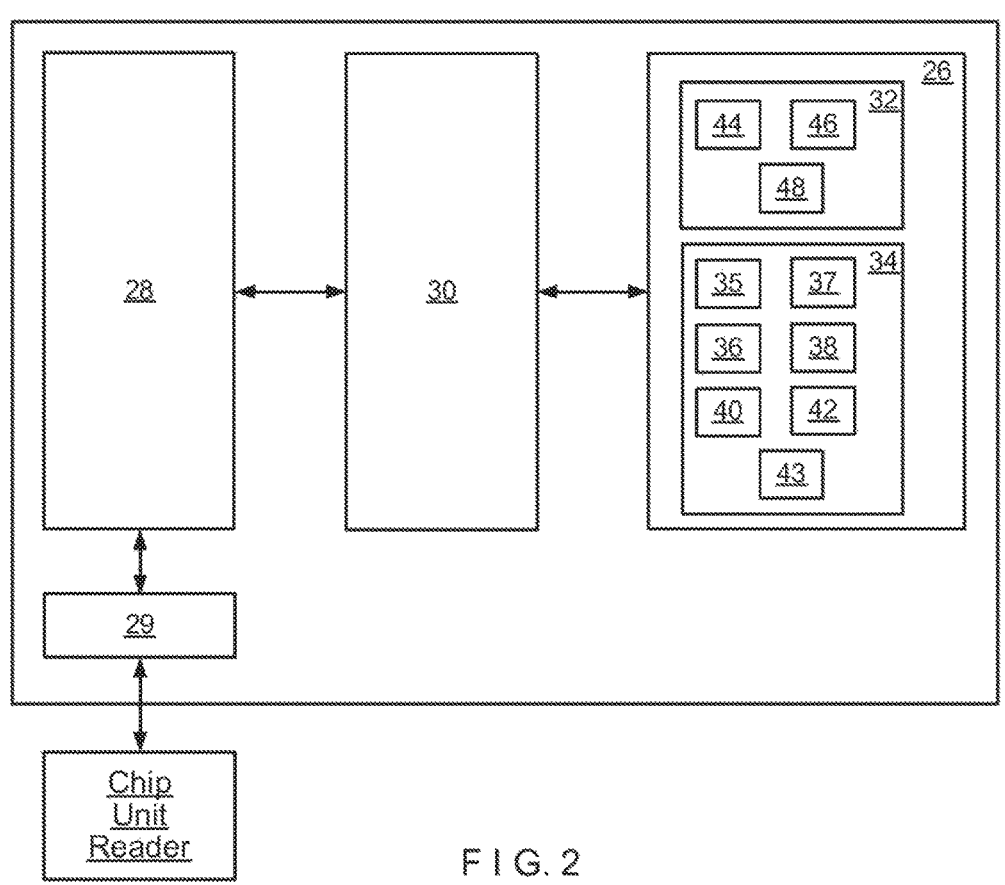
FIG. 2 is a block diagram of a chip unit attached to the beverage holder apparatus according to the present invention.

FIG. 2 is a block diagram of a chip unit 24 that is adapted to communicate with a chip unit reader for payment of the beverage. In general, chip unit 24 includes a memory 26, an interface 28, and antenna 29 and a controller 30. The memory 26 commonly includes both volatile (RAM) and non-volatile (ROM) memory units, and stores one or more software or firmware programs in a program storage portion 32 and stores data in a data storage portion 34.

Data storage portion 34 includes an account identifier such as a unique identification code 35 associated with the chip unit 24 and a security password 37. In certain embodiments the data storage portion 34 may include one or more of financial account data 36, available fund data 38, customer electronic address data 40 and consumer preference data 42.

Program storage portion 32 can include an access module 44 executable by the controller for permitting and controlling the flow of data to and from the interface. The access module 44 includes a "wake up" function, and controls the transmission of data from the memory 26, such as the account identifier 35, to the chip unit reader through the interface 28 and antenna 29.

Program storage portion 32 further may include a setup module 46 executable by the controller 30 for carrying out setup functions associated with the initial purchase of the beverage holder apparatus 20, storing, deleting or modifying the available fund data 38, financial account data 36, customer electronic address data 40 and/or consumer preference data 42.

Program storage portion 32 also may includes a transaction management module 48 executable by the controller 30 for carrying out transaction processes associated with beverage purchases, such as providing financial account data 36 to the chip unit reader via the interface 28 and the antenna 29.

In general, while described above with respect to FIG. 2, it is to be appreciated by one skilled in the art that the chip unit can be any suitable chip unit capable of being attached to a beverage holder and storing requisite information to complete a purchase transaction. For instance, the chip unit can be a contactless radio frequency identification (RFID) tag having memory 26. The RFID tag may be any type of RFID tag including an inductive tag, a battery operated tag, or a capacitively coupled tag.

A merchant can provide a chip unit reader that is capable of interacting with a single type of chip unit or various types of chip units. In general, the reader includes an antenna, which may be positioned at or near the point-of-sale. The antenna emits an infrared beam, a magnetic field and/or radio frequencies (depending upon which type of chip unit is used), for example, which activate and communicate with the chip unit. The activated chip unit sends the account identifier to the reader, which communicates the information to the merchant computer. One of skill in the art will also appreciate that the reader may also be configured to write data to the chip unit.

Figure 3:
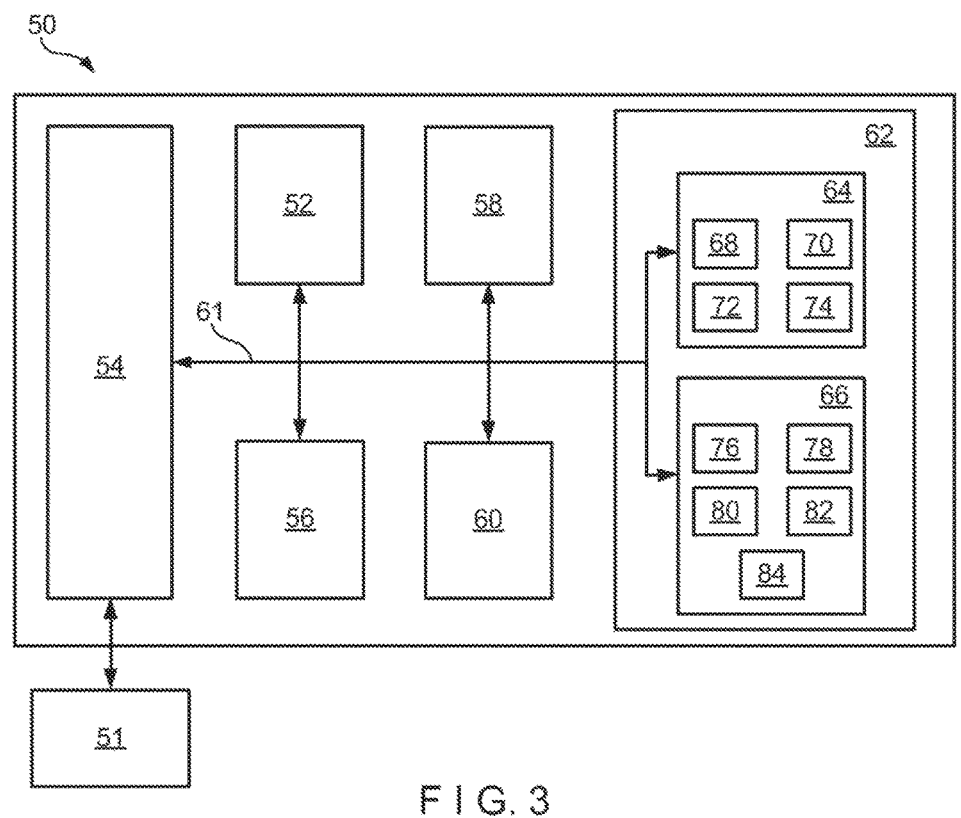
FIG. 3 is a block diagram of a merchant computer connected to a chip unit reader according to a system and method of the present invention.

An exemplary block diagram of a merchant computer 50 adapted to interact with a chip unit 24 via a chip unit reader 51 is shown in FIG. 3. Merchant computer 50 includes a processor 52, such as a central processing unit, an input/output interface 54 and support circuitry 56. The merchant computer 50 can also include a display 58 and an input device 60 such as a keyboard, mouse, pointer and/or handheld scanner are also provided. The display 58, input device 60, processor 52, input/output interface 54 and support circuitry 56 are shown connected to a bus 61 which also connects to a memory 62. Memory 62 includes program storage memory 64 and data storage memory 66. Note that while computer 50 is depicted with direct human interface components display 58 and input device 60, programming of modules and importation and exportation of data can also be accomplished over the interface 54, for instance, in which the computer 50 is connected to a network and the programming and display operations occur on another associated computer.

Program storage memory 64 and data storage memory 66 can each comprise volatile (RAM) and non-volatile (ROM) memory units and can also comprise hard disk and backup storage capacity, and both program storage memory 64 and data storage memory 66 can be embodied in a single memory device or separated in plural memory devices. Program storage memory 64 stores software program modules and associated data. Data storage memory 66 stores user-generated data and/or data generated by the one or more modules. For instance, program storage memory 64 can include one or more of a point-of-sale setup module 68, a purchasing module 70, an account identifier cross-referencing module 72 and a financial facilitator module 74. Data storage memory 66 can include a beverage holder inventory data 76, a listing 78 including account identifier data and associated financial instruments for a plurality of account identifiers in use by customers, customer contact data 80 and customer loyalty data 82.

Merchant computer 50 preferably supports an operating system, for example, stored in program storage memory 64 and executed by the processor 52 from volatile memory. According to an embodiment of the invention, the operating system contains instructions for interfacing the computer 50 to the chip unit reader 52 and to a plurality of beverage holder apparatus 20 via their respective chip units 24.

Figure 4:
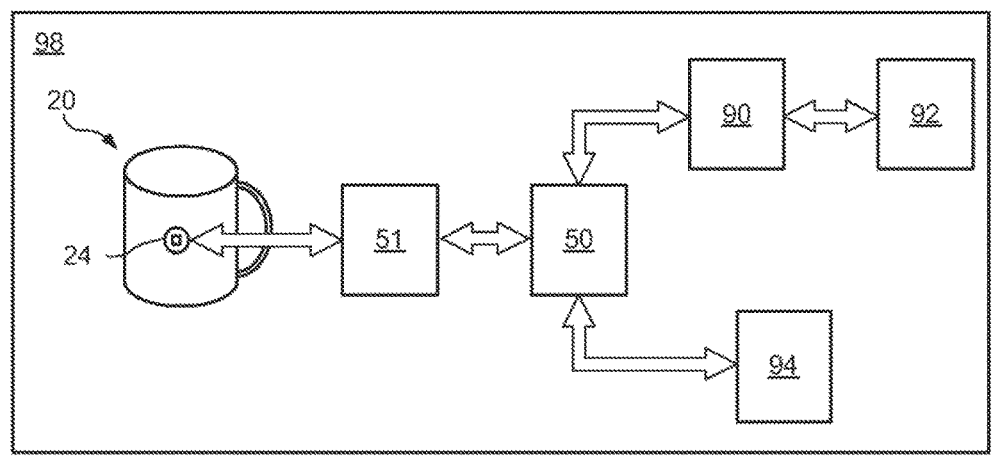
FIG. 4 is a block diagram of a network for performing a transaction according to the present invention.

FIG. 4 is a system 98 including the beverage holder apparatus 20 in communication with a chip unit reader 51, a merchant computer 50 in communication with the chip unit reader 51, and alternate payment systems in communication with the merchant computer 50. In particular, when the customers chip unit 24 includes an account identifier associated with an open-loop payment system, the payment system includes a transaction processing facilitator 90, such as Visa®, in communication with an issuer 92 of the financial account associated with the account identifier. Alternatively, when the customers chip unit 24 includes an account identifier associated with a closed-loop payment system, the payment system includes an issuer 94 without involving an open payment authorization system. In additional alternative embodiments (not shown), value can be associated with the chip unit 24, either by storing value in memory of the chip unit or by associating the chip unit with a stored value account at the merchant computer or a computer networked to the merchant computer, such that when a customer purchases a beverage, value is deducted from the chip unit or account associated with the chip unit.

Figure 5A:
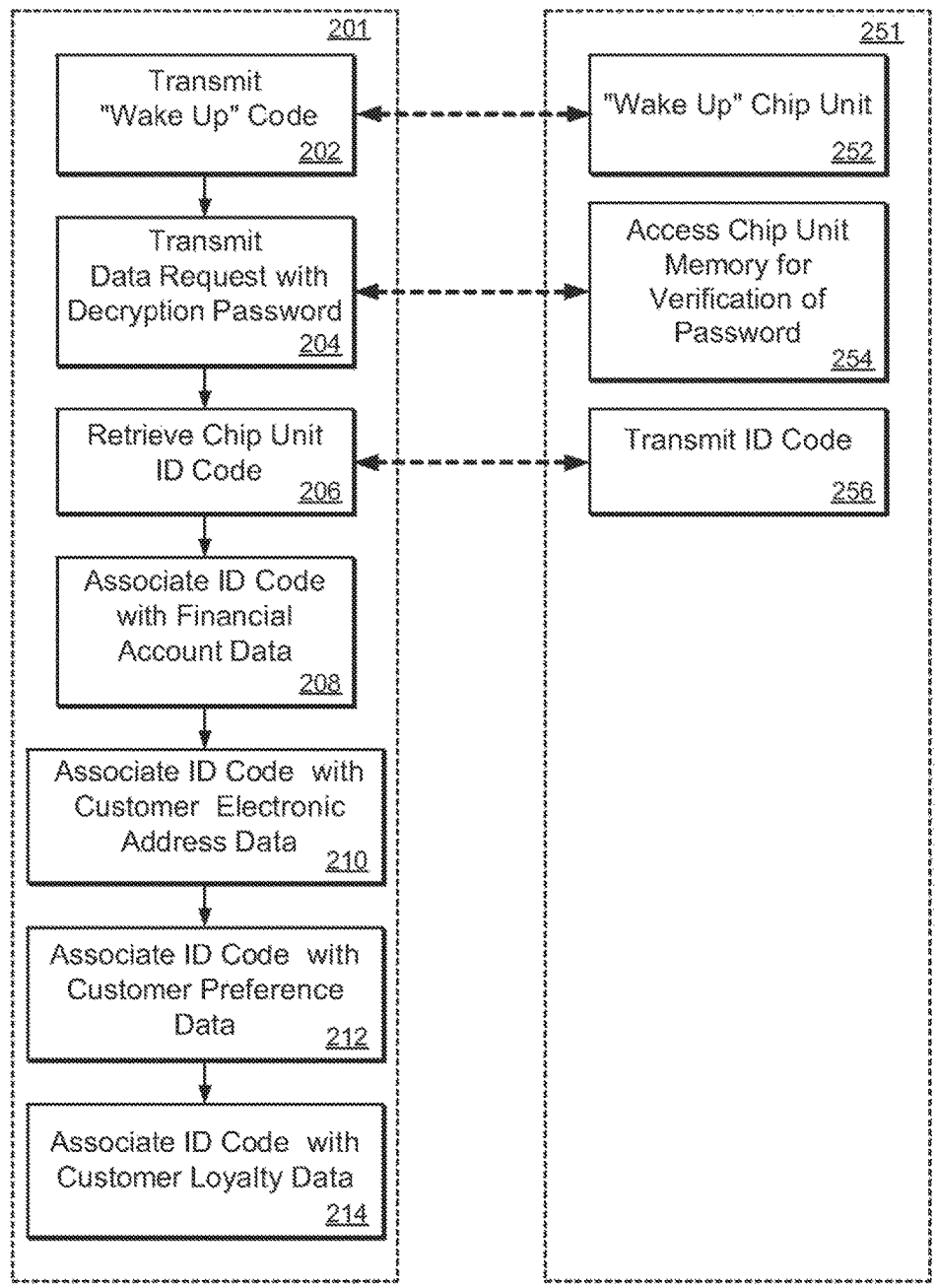
FIG. 5A is a process flow diagram of a chip unit reader and merchant computer communicating with a chip unit for configuring a beverage holder apparatus according to one embodiment of a system and method of the present invention.

FIG. 5A is a process flow diagram of steps performed to configure a chip unit 24, e.g., after initial purchase of a beverage holder apparatus, a beverage holder accessory or a replacement chip unit. This process can also be used to reload available funds or stored value on a previously-purchased chip unit, or to modify the associated data, e.g., change a financial account that is charged or debited when the chip unit is used to make a purchase. The process of FIG. 5A is particularly suited for configuring a chip unit 24 in which specific financial account data is not stored in the memory of the chip unit itself, but rather an account identifier (e.g., chip unit identification code) associated with financial account data at the merchant computer.

Process steps 201 are generally performed by the merchant computer 50, e.g., under control of the setup module 68, and the chip unit reader 51, and process steps 251 are generally performed by the chip unit 24, e.g., under control of the access module 44 and setup module 46 of the chip unit program storage memory 32. In general, to commence any process using the chip unit, a communication between the chip unit reader 51 and the chip unit 24 is established. In particular, steps are carried out in order to "wake up" the chip unit and ensure proper encryption between the chip unit and the merchant computer (via the chip unit reader). While process steps 202, 204, 252 and 254 are illustrated to performed this initial "wake up" and encryption, additional or alternative steps can occur to carry out these functions. As indicated at process step 202, the chip unit reader transmits a "wake-up" code to the chip unit, and the chip unit responds 252. A data request is transmitted to the chip unit including a decryption password at process step 204. The memory of the chip unit is accessed to determine whether the password is valid at step 254. e.g., by comparison to the security password 37 of data storage memory 34 in the chip unit. Note that if the password is invalid, or the chip unit "wake up" function cannot be performed, the transaction ends and the customer can be notified by an alert signal from the reader, the merchant computer, or an individual at the store.

Once a valid and encrypted communication is established between the chip unit reader and the chip unit, the merchant computer 50 retrieves the chip unit identification code 35 from the data storage memory 34 of the chip unit 24, as indicated at steps 206 and 256. This account identification code is then associated with financial account data, as indicated at step 208, and stored in listing 78 of data storage memory 66 of computer 50. This financial account data can be presented by a customer at setup via a financial presentation device such as credit card, debit card, prepaid card, electronic benefit card, charge card, virtual card, smart card, key chain device, personal digital assistant, cell phone, or a stored value device.

The financial account data in listing 78 includes, at minimum, the necessary information to conduct a purchase transaction such as the name on the account, the account number and the expiration date. Other information can also be included such as "track 1" and "track 2" data that is commonly stored on the financial presentation device. In situations in which the beverage holder apparatus, accessory or replacement chip are purchased using the financial presentation device at the time of setup, authorization by the open-loop or closed-loop payment system can be sufficient to verify the financial presentation device. In other embodiments, in which the financial presentation device is not used to purchase the beverage holder apparatus, accessory or replacement chip (e.g., they were previously provided to the customer as a gift, or the customer purchases the beverage holder apparatus, accessory or replacement chip using cash or a financial presentation device other than that used for association with the account identifier), a verification transaction can be conducted to ensure that the financial presentation device is valid.

In alternative embodiments, the financial account data can be based on stored value account that is prepaid at the time of setup. In this case, the amount of prepayment will be applied to the customer's account and stored in the merchant computer, e.g., at listing 78 of data storage memory 66 in computer 50.

In addition, optional data can also be stored in data storage memory 66 and associated with the account identifier, including customer electronic address data 80 (e.g., an email address that is used to transmit an electronic receipt for purchases) as indicated at step 210, customer preference data 82 as indicated at step 212, and customer loyalty data 84 as indicated at step 214.

Figure 5B:
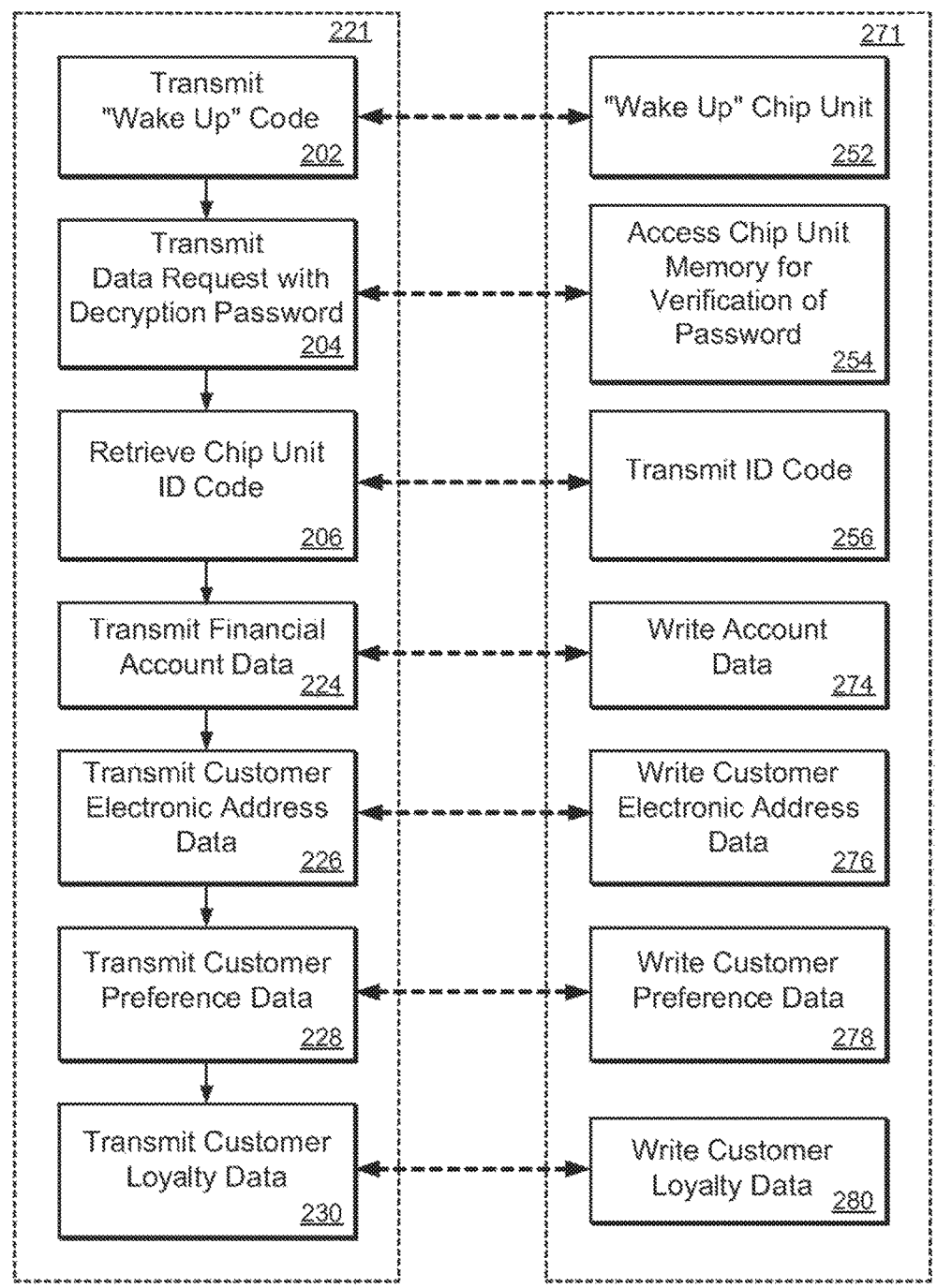
FIG. 5B is a process flow diagram of a chip unit reader and merchant computer communicating with a chip unit for configuring a beverage holder apparatus according to another embodiment of a system and method of the present invention.

FIG. 5B is a process flow diagram of steps performed to configure a chip unit 24 particularly suited for configuring a chip unit 24 in which specific financial account data is stored in the memory of the chip unit. Process steps 221 are generally performed by the merchant computer 50, e.g., under control of the setup module 68, and the chip unit reader 51, and process steps 271 are generally performed by the chip unit 24, e.g., under control of the access module 44 and setup module 46 of the chip unit program storage memory 32. In general, the same steps or a suitable alternative as described with respect to FIG. 5A are executed in order to "wake up" and ensure proper encryption between the chip unit and the merchant computer (via the chip unit reader).

Once a valid and encrypted communication is established between the chip unit reader and the chip unit, the merchant computer 50 retrieves the chip unit identification code 35 from the data storage memory 34 of the chip unit 24, as indicated at steps 206 and 256. The financial account data is then transmitted to the chip unit 24, as indicated at step 224, and stored in the financial instrument data 36 portion of data storage memory 34 in the chip unit 24. This financial account data can be presented by a customer at setup via a financial presentation device such as credit card, debit card, prepaid card, electronic benefit card, charge card, virtual card, smart card, key chain device, personal digital assistant, cell phone, or a stored value device. The financial account data stored in portion 36 includes, at minimum, the necessary information to conduct a purchase transaction such as the name on the account, the account number and the expiration date. Other information can also be included such as "track 1" and "track 2" data that is commonly stored on the financial presentation device.

In alternative embodiments, the financial account data can be based on stored value account that is prepaid at the time of setup. In this case, the amount of prepayment will be applied to the customer's account and stored in the chip unit 24, e.g., as available fund data 38 in data storage memory 34.

In addition, optional data can also be stored in data storage memory 34, including customer electronic address data 40 as indicated at steps 226 and 276, customer's beverage preference data 42 (e.g., strength of brew for coffee) as indicated at steps 228 and 278, and customer loyalty data 43 as indicated at steps 230 and 280.

Upon configuration of a beverage holder apparatus, accessory including a chip unit for attachment to a beverage holder, or a chip unit for insertion into a beverage holder apparatus or accessory for attachment to a beverage holder, the customer is now able to pay for beverage purchases using the account identifier stored on the memory of the chip unit. The account identifier is any code or symbol that can be used to identify a financial account from which payment is made. The account identifier can be a financial account number used in an open-loop or closed-loop payment system, or a stored value account number that is stored on the chip or the merchant computer indicating an amount of available funds for purchase, in certain embodiments, the account identifier is a chip unit identification code that is used by the merchant computer, i.e., to look up a financial account number or a stored value account number that is maintained in memory of the merchant computer or another computer networked to the merchant computer.

In order to further facilitate setup and configuration of the beverage holder apparatus, accessory including a chip unit for attachment to a beverage holder, or a chip unit for insertion into a beverage holder apparatus or accessory (or attachment to a beverage holder, a bar code can be used by a retailer to activate the chip unit account identifier at the time of purchase.

For instance, a beverage holder apparatus having a bar code and a notational value indicated on its packaging or label can be displayed by a merchant (which can be the same or different as the merchant that sells the beverages). The bar code can be associated with the account identifier stored on the chip unit during the manufacturing stage of the beverage holder apparatus. The prepaid beverage holder apparatus can be sold by a merchant and activated at the merchant's point-of-sale. The chip unit contains stored in memory an account identifier associated with financial account data, for instance, similar to a prepaid gift card. Accordingly, the beverage holder apparatus is scanned at point-of-sale and the associated financial account data is activated when the consumer purchases the beverage holder apparatus. The point-of-sale setup module 68 can activate the chip unit by transmitting a message to the issuer/processor of the financial account to provision the account with a prepaid balance of the notational value, or any other value that the consumer desires to add to the financial account. The bar code thus enables faster, simpler, and more automated activation. In addition, if the user desires to reload the chip unit, the bar code can be used, instead of requiring use of a chip unit reader or requiring the consumer or merchant to key in the account identifier or financial account data associated with the chip unit.

Figure 6A:
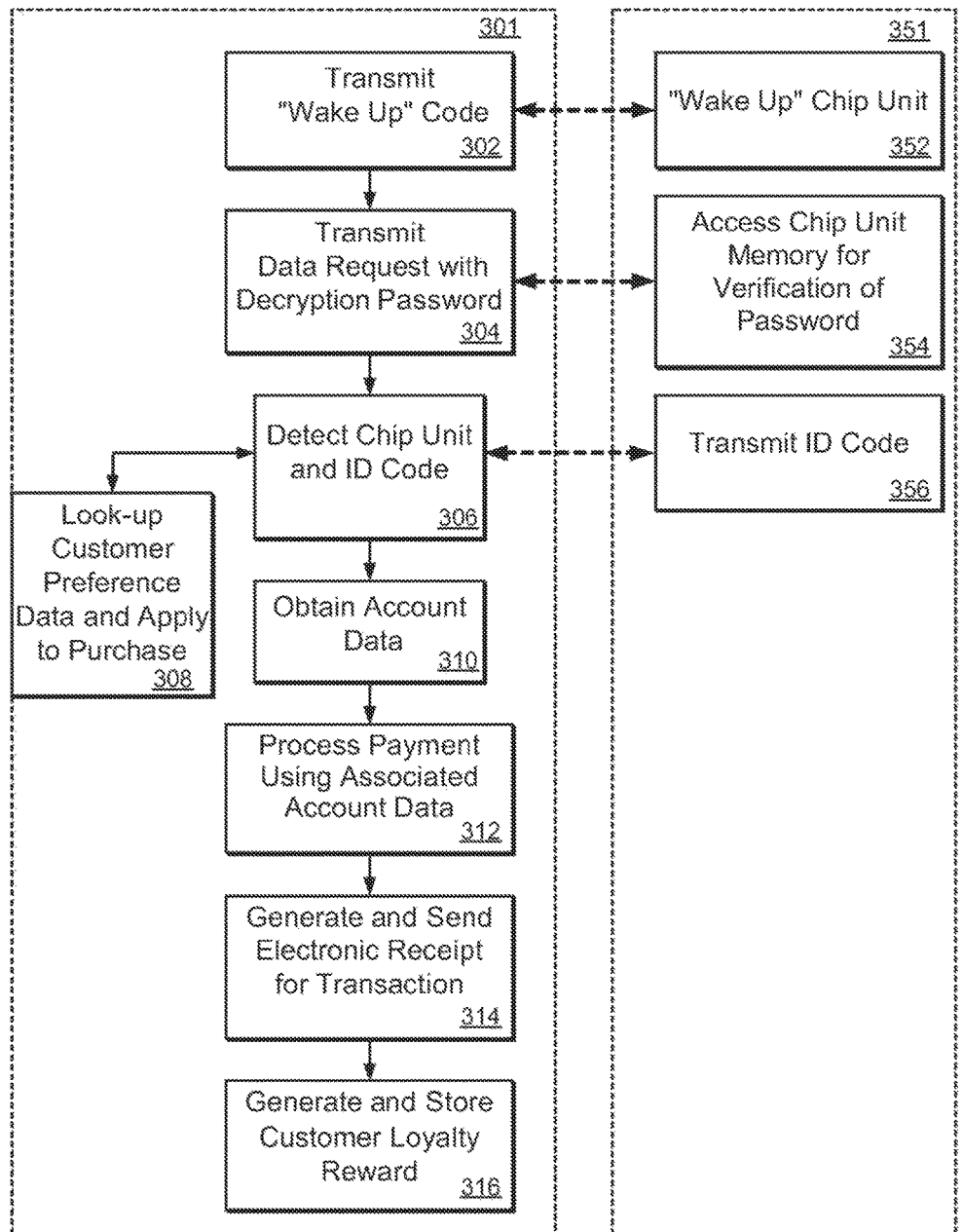
FIG. 6A is a process flow diagram of a chip unit reader and merchant computer communicating with a chip unit for purchasing a beverage using a beverage holder apparatus according to one embodiment of a system and method of the present invention.

FIGS. 6A and 6B are process flow diagrams of a chip unit reader and merchant computer communicating with a chip unit for purchasing a beverage. In the process of FIG. 6A, the account identifier is the identification code of the chip unit. In the process of FIG. 6B, the account identifier is a financial account number or a stored value account number that is stored in memory of the chip unit. In both processes, steps are carried out in order to "wake up" and ensure proper encryption between the chip unit and the merchant computer (via the chip unit reader) in order to establish a communication between the reader and the chip unit. While process steps 302, 304, 352 and 354 are illustrated to performed this initial "wake up" and encryption, additional or alternative steps can occur to carry out these functions. As indicated at process step 302, the chip unit reader transmits a "wake-up" code to the chip unit, and the chip unit responds 352. A data request is transmitted to the chip unit including a decryption password at process step 304. The memory of the chip unit is accessed to determine whether the password is valid at step 354, e.g., by comparison to the security password 37 of data storage memory 34 in the chip unit. Note that if the password is invalid, or the chip unit "wake up" function cannot be performed, the transaction ends and the customer can be notified by an alert signal from the reader, the merchant computer, or an individual at the store.

In the process of FIG. 6A, process steps 301 are generally performed by the merchant computer 50. e.g., under control of the purchasing module 70, and the chip unit reader 51, and process steps 351 are generally performed by the chip unit 24, e.g., under control of the access module 44 and transaction management module 48 of the chip unit program storage memory 32.

When a valid and encrypted communication is established between the chip unit reader and the chip unit, the merchant computer 50 retrieves the account identifier, i.e., the chip unit identification code 35, from the data storage memory 34 of the chip unit 24, as indicated at steps 306 and 356. In step 306, the reader 51 transmits a request to retrieve the account identifier stored in the chip unit memory 35. In step 356, the controller 30 of the chip unit responds by retrieving the stored account identifier and transmitting the retrieved value to the reader 51. In embodiments in which the account identifier includes associated customer preference data 82, this information is used to automatically choose the type of beverage and their preferences. For instance, if the customer's preference is a particular type of coffee with milk and sugar, this information is conveyed to an automatic dispenser, or to an individual preparing the customer's order. Alternatively, even if this data is present, the customer may wish to bypass this step and choose a different beverage or preference.

Next, as indicated at step 310, the customer account data is accessed from listing 78 stored in the data storage memory 66 of the merchant computer 50. The transaction is processed using this associated account data, indicated at step 312. An electronic receipt confirming the transaction can be generated and sent to the customer via the electronic address provided as indicated at step 314. Finally, if the customer is enrolled in a loyalty program, these loyalty rewards can be generated and stored in customer loyalty data 84 in the data storage memory 66 of the merchant computer 50. Loyalty data can include, for example, gratis beverages after a predetermined number of purchases or dollar amount, other gifts, or a donation, for instance, based on the amount of money saved by using their beverage holder in contrast to a disposable cup.

In the process of FIG. 6B, process steps 321 are generally performed by the merchant computer 50, e.g., under control of the purchasing module 70, and the chip unit reader 51, and process steps 371 are generally performed by the chip unit 24. e.g., under control of the access module 44 and transaction management module 48 of the chip unit program storage memory 32.

When a valid and encrypted communication is established between the chip unit reader and the chip unit, the merchant computer 50 requests customer preference data 42, if available, from the chip unit data storage memory 34 and applies this information to the purchase. Specifically, in step 328, the reader 51, under the control of the merchant computer 50, transmits a request to retrieve the customer's beverage preference data stored in the chip unit memory 42. In step 308, the controller 30 of the chip unit responds by retrieving the stored beverage preference data and transmitting the retrieved data to the reader 51. Alternatively, even if this data is present, the customer may wish to bypass this step and choose a different beverage or preference. In step 328, the transmitted request also contains a request to send customer account data.

Next, as indicated at steps 330 and 374, the customer account data is transmitted from financial account data 36 (and available fund data 38, if any) stored in the chip unit data storage memory 34. The account data typically includes an account number, name on the account and expiration date of the account. The transaction is processed using this account data, indicated at step 332. In embodiments in which the account data represents stored value, the transaction amount is deducted from the available fund data 38. This is done by the reader 51 sending a message to reduce the available balance by the cost of the beverage being purchased.

An electronic receipt confirming the transaction can be generated by the merchant computer 50 and sent to the customer via the electronic address transmitted from the customer electronic address data 40 as indicated at steps 334 and 376. In step 334, the merchant computer 50 generates the electronic receipt confirming the transaction and issues a request to retrieve an electronic address from the chip unit memory 34 through the reader 51. In step 376, the controller 30 of the chip unit 51 responds by retrieving the stored electronic address and transmitting the retrieved data to the reader 51.

Finally, if the customer is enrolled in a loyalty program, these loyalty rewards can be generated and stored in customer loyalty data 43. Specifically, in step 336, the merchant computer 50 generates the loyalty points corresponding to the purchase amount and transmits the same to the chip unit 24 through the reader 51. In step 378, the controller 30 of the chip unit 51 responds by adding the loyalty points to the data stored in memory 43 and sends an acknowledgement to the reader 51.

The use of the chip unit 24 can be based on a specified period of time or a number of refills. Accordingly, data can be stored in the chip unit 24 or in the merchant computer 50 that indicates the expiration of the chip unit, and the customer is notified at or prior to the expiration.

Figure 7A:
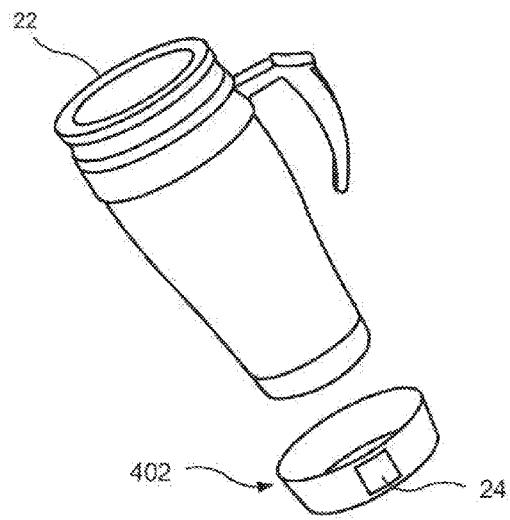
FIGS. 7A and 7B are illustrations of an accessory band incorporating a chip unit for attachment to a beverage holder according to another embodiment of the present invention.
Figure 7B:
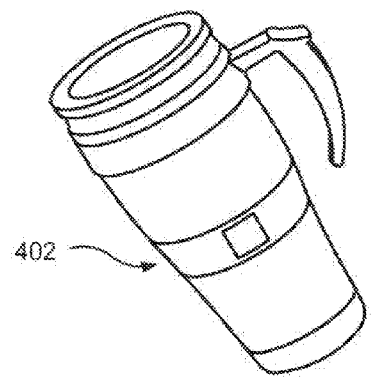

In addition to providing a chip unit attached to a beverage holder, as illustrated with respect to FIG. 1, alternative embodiments of the beverage holder are possible. For instance, various accessories can be provided that are removably attached to a beverage holder. Referring to FIG. 7A, a removable band 402 can be provided, formed of a suitable electrically insulating material and configured to fit over the body of a beverage holder 22 as shown in FIG. 7B. The chip unit 24 can be embedded in this band 402 or inserted into a sleeve thereon. Accordingly, a customer can purchase the band 402 with the attached chip unit 24 and configure it for purchase using the methods described with respect to FIG. 5A or 5B. The band can be removed from the beverage holder 22, for instance, when it has exceeded its useful lifetime, or when the customer desired to wash the beverage holder.

Figure 8A:
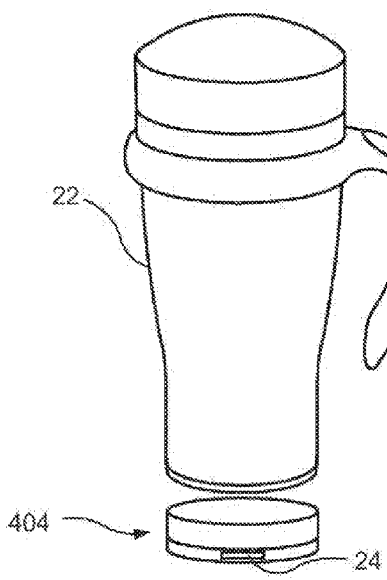
FIGS. 8A and 8B are illustrations of an accessory base incorporating a chip unit for attachment to a beverage holder according to a further embodiment of the present invention.
Figure 8B:
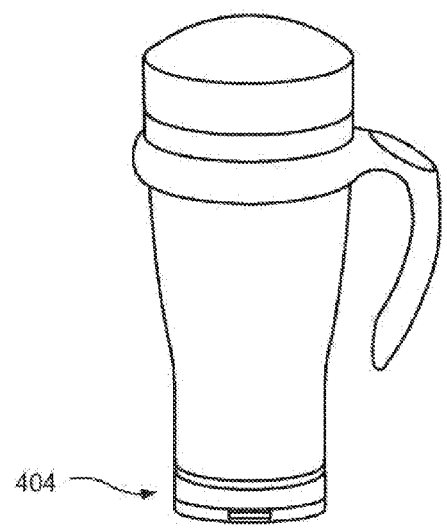

Referring to FIG. 8A, a removable base 404 can be provided, formed of a suitable insulating material and configured to fit on the base of a beverage holder 22 as shown in FIG. 8B. The chip unit 24 can be embedded in this removable base (bottom portion) 404, or can be inserted. Accordingly, a customer can purchase a separate chip unit 24 and configure it for purchase using the methods described with respect to FIG. 5A or 5B, and insert the configured chip unit into the removable base 404. The chip unit or the base 404 can be removed from the beverage holder 22, for instance, when it has exceeded its useful lifetime or when the customer desired to wash the beverage holder.

Figure 9A:
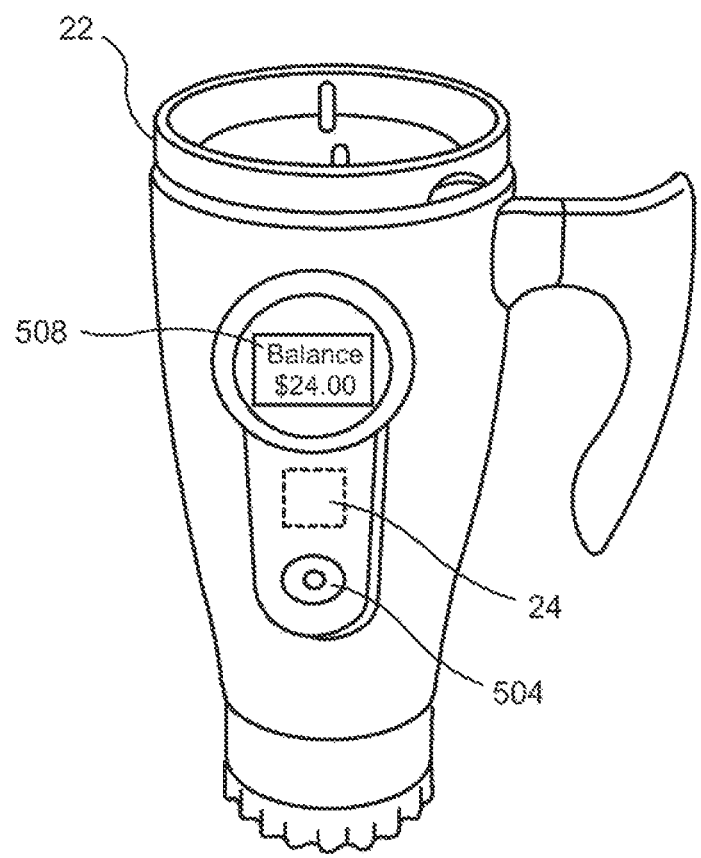
FIG. 9A is an illustration of a beverage holder apparatus according to an embodiment of the present invention including an integrated display.
Figure 9B:
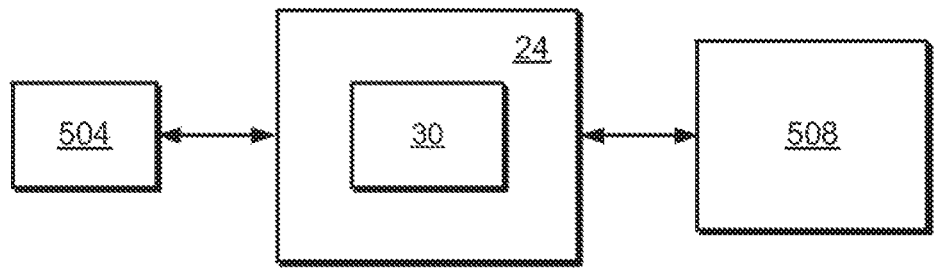
FIG. 9B is a block diagram depicting connectivity between the display, the chip unit and a switch in the beverage holder apparatus of FIG. 9A.

FIGS. 9A and 9B show another embodiment of the present invention in which a display 508 is integrated on the beverage holder and is coupled to the controller 30 of the chip unit 24. A switch 504 is coupled to controller 30 of the chip unit 24 to activate/deactivate a display 508 for displaying the transaction value, available funds retrieved from the memory 38, number of uses or remaining uses, or other data associated with the data storage portion 34 of the chip unit memory 26.

FIG. 10 depicts a form factor of a card 515 having a removable chip unit 24 that can be configured for use with a beverage holder apparatus or accessory for a beverage holder apparatus according to an embodiment of the present invention. For instance, a customer can purchase the card 515, activate and configure it according to the methods described with respect to FIG. 5A or 5B, and insert it into a slot or other location on the beverage holder apparatus or accessory for the beverage holder apparatus.

FIG. 11 shows a beverage holder apparatus in which the chip unit is removably attached in a recessed region 712 that is positioned behind an access door 710. Recessed region 712 is configured and dimensioned to lightly receive the chip unit, e.g., purchased separately by a customer using the form factor card 515. When closed, the access door 710 can be flush with the body of the beverage holder.

FIG. 12 shows another embodiment of an accessory band 802 for attachment to a beverage holder. A slot 822 is configured and dimensioned to tightly receive the chip unit, e.g., purchased separately by a customer using the form factor card 515.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A beverage holder apparatus comprising:
a holder for holding a beverage; and
a chip unit attached to the holder and adapted to communicate with a chip unit reader to perform a payment transaction to purchase the beverage provided by an entity associated with the chip unit reader;
wherein the chip unit stores:
an account identifier;
data related to the account identifier; and
master security data;
wherein the chip unit is configured to:
receive a data request message from the chip unit reader;
identify security data in the data request message;
compare the security data of the data request message to the stored master security data;
determine that the security data of the data request message is valid based on the comparing;
establish an encrypted communication link with the chip unit reader based on the determining; and
transmit, using the encrypted communication link between the chip unit and the chip unit reader, the account identifier to a payment system that authorizes the payment transaction.

2. The beverage holder apparatus of claim 1, wherein the account identifier is associated with financial data stored at a third party computer.

3. The beverage holder apparatus of claim 1, wherein the data related to the account identifier stored on the chip unit is non-financial data.

4. The beverage holder apparatus of claim 1, wherein the account identifier includes chip unit identification code.

5. The beverage holder apparatus of claim 1, wherein the data related to the account identifier stored on the chip unit includes information necessary to conduct the payment transaction.

6. The beverage holder apparatus of claim 5, wherein the data related to the account identifier stored on the chip unit includes an account number.

7. The beverage holder apparatus of claim 1, wherein the account identifier includes an account number used in an open-loop or closed-loop payment system.

8. The beverage holder apparatus of claim 1, wherein the chip unit stores an electronic address to which a merchant computer transmits a receipt for purchasing the beverage.

9. A system comprising:
the beverage holder apparatus of claim 1; and
the chip unit reader for receiving the account identifier from the chip unit of the beverage holder apparatus and for communicating with an issuer to perform the payment transaction to purchase the beverage.

10. A method for performing a payment transaction to purchase a beverage comprising:
receiving a data request message from a chip reader by a chip unit attached to a beverage holder for holding the beverage;
identifying security data in the data request message;
comparing the security data of the data request message to master security data stored at a memory of the chip unit;
determining that the security data of the data request message is valid based on the comparing;
establishing an encrypted communication link with the chip reader based on the determining;
retrieving an account identifier stored in the memory of the chip unit; and
transmitting, using the encrypted communication link between the chip unit and the chip reader, the account identifier to a payment system that authorizes the payment transaction.

11. The method of claim 10, wherein the account identifier is associated with financial data stored at a third party computer.

12. The method of claim 10, wherein data related to the account identifier stored on the chip unit is non-financial data.

13. The method of claim 10, wherein the account identifier includes chip unit identification code.

14. The method of claim 10, wherein data related to the account identifier stored on the chip unit includes information necessary to conduct the payment transaction.

15. The method of claim 14, wherein the data related to the account identifier stored on the chip unit includes an account number.

16. The method of claim 10, wherein the account identifier includes an account number used in an open-loop or closed-loop payment system.

17. The method of claim 10, wherein the memory of the chip unit stores an electronic address to which a merchant computer can transmit a receipt for purchasing the beverage; the step of transmitting includes transmitting the electronic address to the chip reader.

* * * * *